(12) United States Patent
Rapaich

(10) Patent No.: US 7,151,970 B1
(45) Date of Patent: Dec. 19, 2006

(54) MULTIPLE AUDIO DACS WITH PC COMPATIBILITY

(75) Inventor: Mark Rapaich, Westfield, IA (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 09/186,817

(22) Filed: Nov. 5, 1998

(51) Int. Cl.
  *G06F 17/00* (2006.01)
(52) U.S. Cl. .................... 700/94; 341/110; 375/216
(58) Field of Classification Search .............. 700/94; 704/200, 200.1, 201, 22, 69; 381/22–23, 381/58, 123; 341/110, 155, 156, 143–145, 341/141, 214; 710/69; 375/216, 242, 260, 375/349, 262, 265; 370/269, 355
See application file for complete search history.

(56) References Cited

U.S. PATENT DOCUMENTS

| | | | | |
|---|---|---|---|---|
| 5,003,407 A * | 3/1991 | Nakano et al. | ............... | 386/97 |
| 5,153,592 A * | 10/1992 | Fairchild et al. | ............ | 341/118 |
| 5,192,999 A * | 3/1993 | Graczyk et al. | .............. | 358/85 |
| 5,297,231 A * | 3/1994 | Miller | ......................... | 381/35 |
| 5,307,456 A | 4/1994 | MacKay | .................... | 395/154 |
| 5,592,508 A * | 1/1997 | Cooper | ....................... | 375/216 |
| 5,666,291 A | 9/1997 | Scott et al. | .............. | 395/200.8 |
| 5,737,011 A | 4/1998 | Lukacs | ......................... | 348/15 |
| 5,774,567 A * | 6/1998 | Heyl | .......................... | 381/119 |
| 5,784,457 A | 7/1998 | Haba | ............................ | 379/421 |
| 5,802,281 A | 9/1998 | Clapp et al. | ........... | 395/200.04 |
| 5,844,606 A | 12/1998 | Suemoto et al. | ............ | 348/375 |
| 5,896,291 A * | 4/1999 | Hewitt et al. | ................. | 381/61 |
| 5,914,797 A | 6/1999 | Yamamoto et al. | ......... | 359/146 |
| 5,929,895 A | 7/1999 | Berry et al. | .................... | 348/8 |
| 5,937,176 A | 8/1999 | Beasley et al. | ............. | 395/311 |
| 5,963,246 A | 10/1999 | Kato | .......................... | 348/15 |
| 5,977,899 A * | 11/1999 | Adams | ....................... | 341/145 |
| 6,052,471 A * | 4/2000 | Van Ryzin | ................... | 381/85 |
| 6,215,737 B1 * | 4/2001 | Thagard et al. | ................ | 369/4 |
| 6,241,610 B1 | 6/2001 | Miyamoto et al. | ........... | 463/33 |
| 6,356,545 B1 * | 3/2002 | Vargo et al. | ................ | 370/355 |

FOREIGN PATENT DOCUMENTS

| | | |
|---|---|---|
| WO | 95/00917 | 1/1995 |
| WO | 97/00491 | 1/1997 |

OTHER PUBLICATIONS

Peter B. Galvin Operating System Concepts 1994 by addison-Wesley Publishing company, inc.fourth edition.*

* cited by examiner

*Primary Examiner*—Vivian Chin
*Assistant Examiner*—Lao Lun-See
(74) *Attorney, Agent, or Firm*—Scott Charles Richardson; McGrath, Geissler, Olds

(57) ABSTRACT

Multiple audio digital to analog converters (DACs) are provided to convert multiple digital audio streams to analog audio signals concurrently in a personal computer. Different digital audio streams are routed to each DAC and audio output device depending on priority, desired quality and the source of the audio stream.

17 Claims, 3 Drawing Sheets

MULTIPLE AUDIO DACS WITH PC COMPATIBILITY

FIELD OF THE INVENTION

The present invention relates to digital audio in computer systems, and in particular to handling multiple digital-to-analog converters concurrently in the same personal computer system.

BACKGROUND

Personal computers have long incorporated the ability to produce sound by means of an audio device that converts digital signals controlled by the computer to analog audio waveforms. These analog signals may then be played through a speaker internal to the computer, or amplified and played through external speakers. The device that converts digital signals to analog audio output most often takes the form of an add-in adapter card, that contains both circuitry to interface the board to the computer system bus and circuitry to convert digital signals received from the computer to an analog audio waveform and amplify it.

Inclusion of Compact Disc players within computers later led to audio adapter cards that included the ability to route analog signals. When playing conventional audio CDS, the analog signal provided by the CD player within the computer is routed to the audio adapter in analog form, where it is routed to an amplifier at the control of the computer and played through the attached speakers. Alternatively, the compact disc player can provide a digital signal to the audio adapter, which then converts it to analog audio by means of a digital-to-analog converter before amplification. Most audio adapters currently available have the capability to play either a single digital audio signal provided over the computer bus or analog information provided by the internal compact disc player, but not both digital and analog information or digital information from two different sources.

The steady growth in multimedia capability of computers has brought about the ability to play CD audio, audio to accompany motion video or games, telephone or other communication audio, and system audio information such as traditional beeps. However, current products do not allow selection of more than one source for conversion to analog audio at the same time because a single digital-to-analog converter is present on an adapter for each channel of a stereo system. No provision is made for a configurable means of prioritizing audio sources for playing through the audio adapter.

This lack of ability to handle more than one audio signal at the same time in a configurable manner causes significant problems in computer systems incorporating several audio sources. Relatively unimportant system beeps may interrupt a movie being viewed by means of a DVD player, while important telecommunications audio such as notice of a phone call or fax may not be played at all. There is a need for a computer system to handle more than one audio source at the same time, in a manner that the user can configure based on his predetermined priorities.

SUMMARY OF THE INVENTION

Multiple audio digital-to-analog converters (DACs) are provided to convert multiple digital audio streams to analog audio signals concurrently. Also provided is the ability for the user to configure the audio adapter such that certain audio sources are routed to each converter, and routed with a given priority.

In one embodiment, the adapter contains multiple DACs, such that a different digital audio stream may be routed to each DAC. In a further embodiment, the user may configure which digital audio streams are to be routed to which DAC, and with what priority the streams are routed. The audio adapter may also route an analog signal not provided by the DAC to an output, such as may be provided by a CD player, according to a user configuration of the routing portion of a controller.

In another embodiment, the audio adapter contains both a high-quality DAC and a standard-quality coder-decoder (CODEC). The CODEC has both the function of a standard-quality DAC and a standard-quality analog-to-digital converter (ADC). The high quality DAC is a more expensive converter than the CODEC, and is capable of producing higher quality output from high quality digital input signals. The audio adapter may route analog signals, such as from a CD player, from a microphone, or from another source such as the high-quality DAC to the output as well as to the CODEC. Analog signals so routed to the CODEC may be digitized by the CODEC and processed or combined with other digital audio signals the adapter routes to the CODEC.

DETAILED DESCRIPTION

In the following description, reference is made to the accompanying drawings, which form a part of this description and show by way of illustration specific embodiments in which the invention may be practiced. These embodiments are described in sufficient detail to enable those skilled in the art to practice the invention. Other embodiments may also be utilized to practice the invention, and structural, logical, and electrical changes may be made without departing from the scope of the present invention. The following description is, therefore, not to be taken in a limiting sense, and the scope of the present invention is defined by the appended claims.

Figure 1:
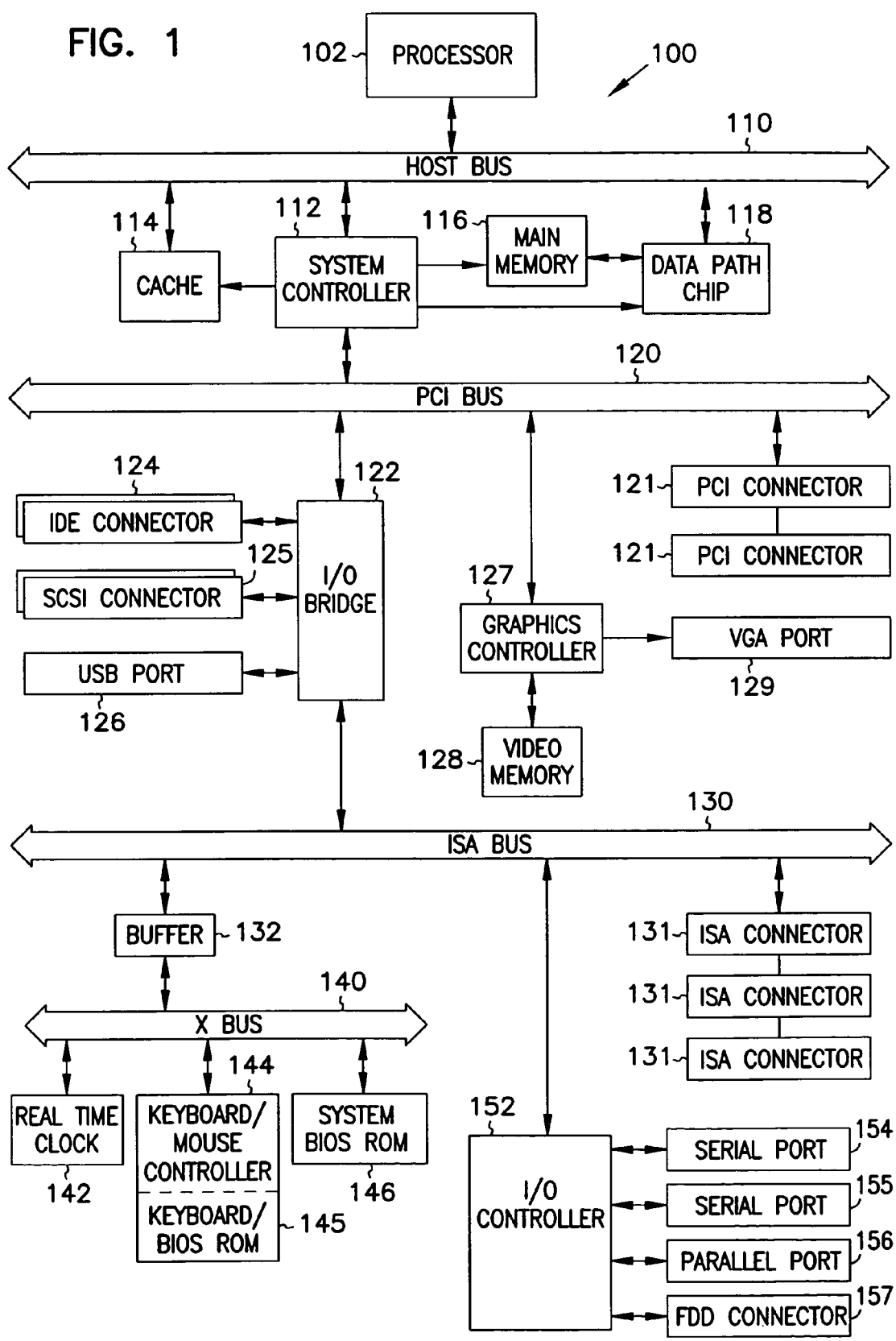
FIG. 1 is a block diagram of a typical computer system in accordance with the present invention.

FIG. 1 shows a block diagram of a computer system 100 according to the present invention. In this embodiment, processor 102, system controller 112, cache 114, and data-path chip 118 are each coupled to host bus 110. Processor 102 is a microprocessor such as a 486-type chip, a Pentium®, Pentium II® or other suitable microprocessor. Cache 114 provides high-speed local-memory data (in one embodiment, for example, 512 kB of data) for processor 102, and is controlled by system controller 112, which loads cache 114 with data that is expected to be used soon after the data is placed in cache 112 (i.e., in the near future). Main memory 116 is coupled between system controller 114 and data-path chip 118, and in one embodiment, provides random-access memory of between 16 MB and 128 MB of data. In one embodiment, main memory 116 is provided on SIMMs (Single In-line Memory Modules), while in another embodiment, main memory 116 is provided on DIMMs (Dual In-line Memory Modules), each of which plugs into suitable sockets provided on a motherboard holding many of the other components shown in FIG. 1. Main memory 116 includes standard DRAM (Dynamic Random-Access Memory), EDO (Extended Data Out) DRAM, SDRAM (Synchronous DRAM), or other suitable memory technology. System controller 112 controls PCI (Peripheral Component Interconnect) bus 120, a local bus for system 100 that provides a high-speed data path between processor 102 and various peripheral devices, such as graphics devices, storage drives, network cabling, etc. Data-path chip 118 is also controlled by system controller 112 to assist in routing data between main memory 116, host bus 110, and PCI bus 120.

In one embodiment, PCI bus 120 provides a 32-bit-wide data path that runs at 33 MHZ. In another embodiment, PCI bus 120 provides a 64-bit-wide data path that runs at 33 MHZ. In yet other embodiments, PCI bus 120 provides 32-bit-wide or 64-bit-wide data paths that runs at higher speeds. In one embodiment, PCI bus 120 provides connectivity to I/O bridge 122, graphics controller 127, and one or more PCI connectors 121 (i.e., sockets into which a card edge may be inserted), each of which accepts a standard PCI card. In one embodiment, I/O bridge 122 and graphics controller 127 are each integrated on the motherboard along with system controller 112, in order to avoid a board-connector-board signal-crossing interface and thus provide better speed and reliability. In the embodiment shown, graphics controller 127 is coupled to a video memory 128 (that includes memory such as DRAM, EDO DRAM, SDRAM, or VRAM (Video Random-Access Memory)), and drives VGA (Video Graphics Adaptor) port 129.

VGA port 129 can connect to industry-standard monitors such as VGA-type, SVGA (Super VGA)-type, XGA-type (eXtended Graphics Adaptor) or SXGA-type (Super XGA) display devices. Other input/output (I/O) cards having a PCI interface can be plugged into PCI connectors 121.

In one embodiment, I/O bridge 122 is a chip that provides connection and control to one or more independent IDE connectors 124–125, to a USB (Universal Serial Bus) port 126, and to ISA (Industry Standard Architecture) bus 130. In this embodiment, IDE connector 124 provides connectivity for up to two standard IDE-type devices such as hard disk drives, CDROM (Compact Disk-Read-Only Memory) drives, DVD (Digital Video Disk) drives, or TBU (Tape-Backup Unit) devices. In one similar embodiment, two IDE connectors 124 are provided, and each provide the EIDE (Enhanced IDE) architecture. In the embodiment shown, SCSI (Small Computer System Interface) connector 125 provides connectivity for up to seven or fifteen SCSI-type devices (depending on the version of SCSI supported by the embodiment). In one embodiment, I/O bridge 122 provides ISA bus 130 having one or more ISA connectors 131 (in one embodiment, three connectors are provided). In one embodiment, ISA bus 130 is coupled to I/O controller 152, which in turn provides connections to two serial ports 154 and 155, parallel port 156, and FDD (Floppy-Disk Drive) connector 157. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146.

FIG. 1 shows one exemplary embodiment of the present invention, however other bus structures and memory arrangements are specifically contemplated.

Figure 2:
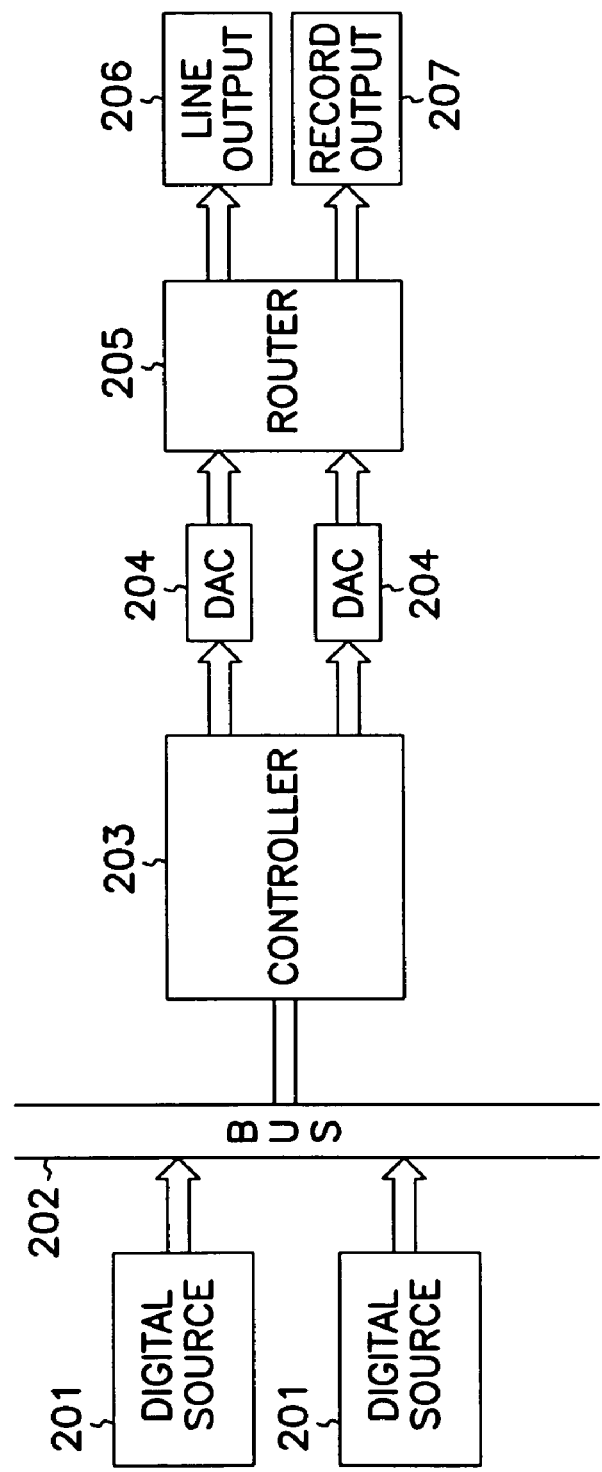
FIG. 2 is a block diagram of the present invention that incorporates multiple audio DACs and the ability to route digital or analog streams to an output or outputs.

A personal computer with multiple audio DACs is shown in FIG. 2. Multiple audio sources 201 generate digital audio signals that a controller 203 routes to multiple digital-to-analog converters 204. The audio sources are selected from a group comprising CD players, microphones, DVD audio, computer-generated audio, audio provided through an external user input, or any other device capable of providing a digital audio signal to the controller.

In one embodiment, a user may configure the controller 203 to assign each digital audio signal to a specific digital-to-analog converter 204. Digital audio signals from each source 201 are then routed only to the converter 204 to which the user has assigned the source. The user configures the controller 203 by means of hardware settings such as jumpers or switches, or may configure the controller via software, either by expressly identifying the settings in a table or by use of standard visual programming constructs.

In a further embodiment, a user configures the controller 203 to assign each digital audio signal a priority, so that if multiple digital audio signals assigned to the same converter are available to the controller the controller will route only the signal with the highest assigned priority to the assigned digital-to-analog converter 204. The user alternatively assigns each digital signal a priority but not to a specific DAC 204, so that the controller 203 will route the signal with the highest priority to the first available DAC, and the next highest priority signal to the second available DAC, and so on, until all DACs are in use and no longer available.

In another embodiment, the digital audio signals are conveyed from the digital source 201 to the controller 203 by means of a standard personal computer system bus 202. In a different embodiment, the digital audio signals are conveyed from the digital source 201 to the controller 203 by means of a direct electrical or optical connection between the two.

The personal computer system claimed also includes a routing means or standard multiplexer 205 such that the user configures the controller 203 to route the outputs of each DAC to an assigned output. The outputs include a standard line output 206, and a record output 207. In a further embodiment, the routing means also routes analog signals not provided by the DACs 204, such as from a TV tuner, external analog audio input or another analog audio source.

Figure 3:
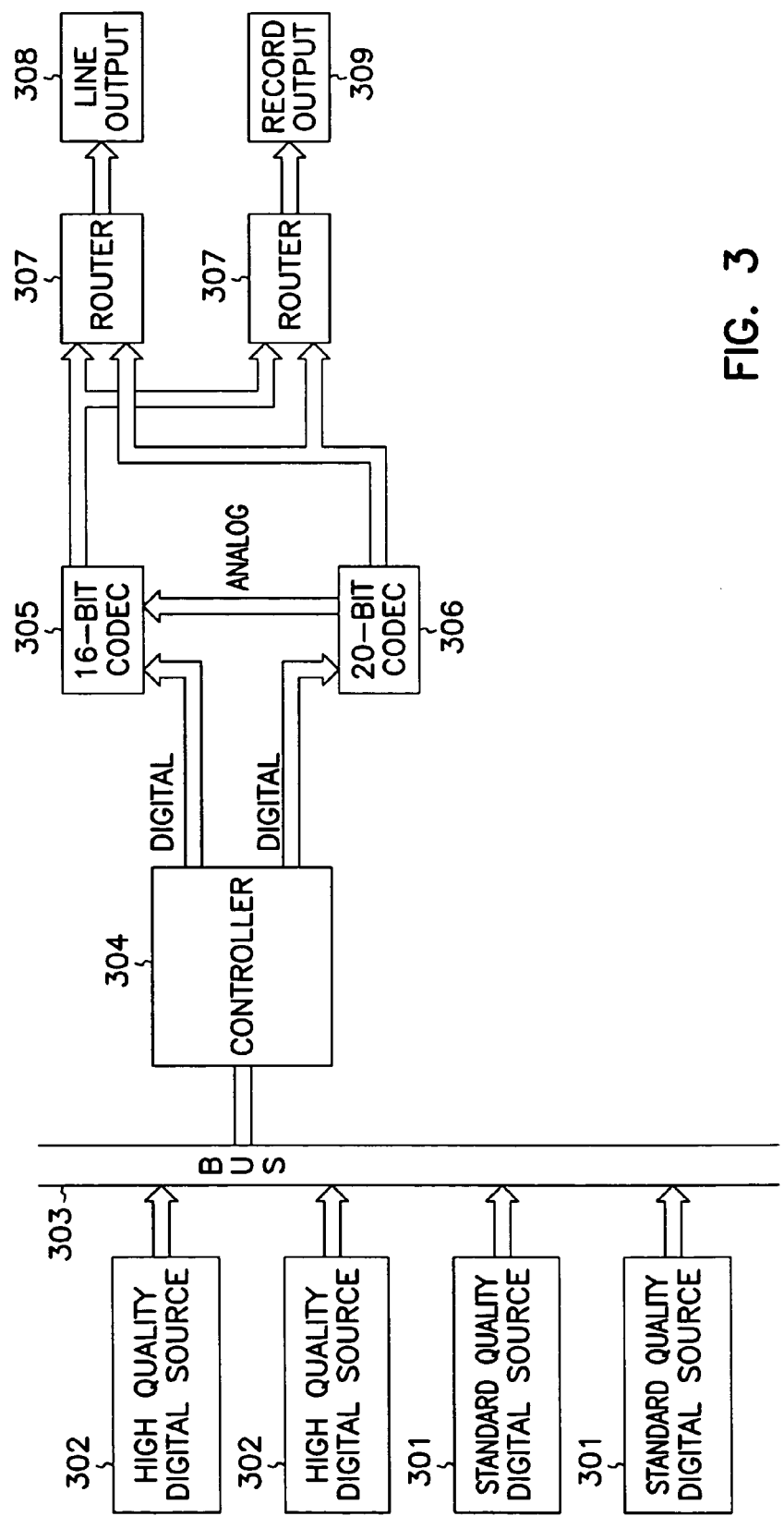
FIG. 3 is a block diagram of the present invention that incorporates a high-quality DAC and a low-quality CODEC, and a configurable means of routing digital and analog signals to the appropriate converter and appropriate output.

FIG. 3 shows an embodiment of the invention where the digital audio sources comprise both standard quality digital audio sources 301 and high quality digital audio sources 302. The standard quality digital audio sources are sources that provide standard quality digital signals such as computer program-generated sounds and system sounds. High quality digital audio sources may include sources of high quality digital signals such as CD players and DVD players. This embodiment also comprises at least one high quality DAC 306 and at least one standard quality DAC 305.

In a preferred embodiment, the standard quality DAC 305 takes the form of a coder-decoder that contains both a 16-bit digital-to-analog converter and a 16-bit analog-to-digital converter, and the high-quality DAC takes the form of a 20-bit DAC.

The user configures the controller 304 to assign each quality of digital signal to a corresponding quality of converter. In such an embodiment, the high quality digital audio signals are assigned to the high-quality DAC 306 and the standard quality signals are assigned to the standard-quality DAC 305. The user may also configure the controller to assign each digital signal source a priority, so that for the above embodiment with both a 16-bit and a 20-bit converter only the digital audio signal with the highest priority for the 20-bit converter is sent to the 20-bit converter, and only the digital audio signal with the highest priority for the standard 16-bit converter is sent to the 16-bit converter.

The above embodiments enable the personal computer to handle multiple DACs simultaneously, and to provide outputs for multiple digital audio sources from a single personal computer. A router 307 may route analog signals produced by the converters 305 and 306 to outputs such as a line output 308 or a record output 309. The line and record outputs may be provided to the user through back panel output jacks on the computer, or though other means. The router 307 may take the form of a multiplexer that is controlled by the controller 304. The user may configure the controller 304 to route the output from a specific DAC 305 or 306 to a desired output 308 or 309 by means of the router 307. The controller 304 may direct the router 307 by means of hardware settings such as jumpers or switches that form a part of the personal computer, or by means of software that is executed on the personal computer.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A personal computer system comprising:
   a plurality of audio digital-to-analog converters configured as part of the personal computer system; and
   a controller configured to receive digital audio signals from multiple sources and route the digital audio signals to a selected digital-to-analog converter based on a desired converter quality.

2. The personal computer system of claim 1 where a user configures the controller such that the controller assigns a digital-to analog converter and a priority to each of the plurality of audio sources, and the controller routes the digital audio signal with the highest priority for each of the digital-to-analog converters to its assigned digital-to-analog converter.

3. The personal computer system of claim 1 where a user configures the controller by hardware or software controls, such that the controller routes a selected analog signal to a selected one of a plurality of analog outputs.

4. The personal computer system of claim 3 where the selected analog signal is provided by one of a group consisting of the digital-to-analog converters, Compact Disc players, DVD players, microphones, TV tuners, or analog inputs.

5. The personal computer system of claim 1, further comprising a standard personal computer bus for transferring the digital audio signal from the digital audio source to the controller.

6. The personal computer system of claim 1 where the digital audio signal is transferred from the digital audio source to the controller by a direct electrical or optical connection between the two.

7. The personal computer system of claim 1, wherein each of said plurality of audio digital-to-analog converters has an indication of quality.

8. A personal computer system comprising:
   one or more standard digital audio sources;
   one or more high quality digital audio sources;
   means for routing digital audio signals from standard digital audio sources to a standard quality digital-to-analog converter based on a first desired converter quality; and
   means for routing digital audio signals from a high-quality digital audio source to a high quality digital-to-analog converter based on a second desired converter quality higher than said first desired converter quality;
   wherein said means for routing digital audio signals from standard digital audio sources to a standard quality digital-to-analog converter is configured as part of the personal computer system; and
   wherein said means for routing digital audio signals from a high-quality digital audio source to a high quality digital-to-analog converter is configured as part of the personal computer system.

9. The personal computer system of claim 8 where any of the high quality or standard quality digital-to-analog converters are coder-decoders (CODECs) that contain both digital-to-analog converters and analog-to-digital converters.

10. The personal computer system of claim 8,
    wherein the standard quality digital-to-analog converter is configured as part of the personal computer system; and
    wherein the high quality digital-to-analog converter configured as part of the personal computer system.

11. A method of routing digital audio to a plurality of digital-to-analog converters in a personal computer, wherein said plurality of digital-to-analog converters are configured as part of the personal computer, comprising the steps of:
    receiving digital audio data from one of a plurality of digital audio sources; and routing the digital audio data to one of the plurality of converters based on desired converter quality;
    wherein said routing of the digital audio data to one of said plurality of converters is performed by the personal computer.

12. The method of claim 11 further comprising the steps of:
    assigning digital audio data from each source a priority;
    assigning digital audio data from each source to one of the plurality of converters;
    determining which digital audio data has the highest priority among all data assigned to each converter; and
    converting the digital audio data in each converter with the highest priority to analog audio.

13. The method of claim 11, further comprising:
    assigning an indication of quality to each of the plurality of digital-to-analog converters;
    wherein the routing of the digital audio data is based on said one of the plurality of converters being a closest match to the desired converter quality.

14. A method of routing digital audio to a plurality of audio digital-to analog converters in a personal computer, wherein said plurality of digital-to-analog converters are configured as part of the personal computer, comprising the steps of:
    receiving digital audio from one of a plurality of digital audio sources;
    assigning digital audio data from each of said plurality of digital audio sources a priority associated with a desired converter quality; and muting the digital audio data to one of the plurality of convener in an order determined by the assigned data priority,
    wherein said routing of the digital audio data to one of the plurality of converters is performed by the computer.

15. A personal computer system comprise
    memory;
    a processor;
    a bus;
    a plurality of digital-to-analog audio converters; and a controller configured to receive digital audio signals from multiple sources and route the digital audio signals to a selected ones of the digital-to-analog audio converters based on desired converter quality;

wherein said plurality of digital audio converters are configured as part of said personal computer system.

16. The personal computer system of claim 15, further comprising:

a computer speaker configured to receive analog signals converted from the digital audio signals by the selected digital-to-analog converter.

17. A method of routing digital audio signals in a personal computer, wherein said plurality of digital-to-analog converters are configured as part of the personal computer, comprising the steps of:

routing the digital audio signals which are from standard digital audio sources to a standard quality digital-to-analog converter; and routing the digital audio signals which are from high-quality audio sources to a high-quality digital-to-analog converter; wherein said high-quality audio sources provide higher quality signals than said standard digital audio sources and said high-quality digital-to-analog converter produce a higher quality digital-to-analog conversion than said standard quality digital-to-analog converter;

wherein said routing of the digital audio data to one of the plurality of converters is performed by the computer.

* * * * *